United States Patent [19]
Hock

[11] Patent Number: 6,112,947
[45] Date of Patent: Sep. 5, 2000

[54] ADJUSTABLE TANK OVERFLOW FOR FLUID CHEMICALS

[75] Inventor: Yeoh Boon Hock, Singapore, Singapore

[73] Assignee: Chartered Semiconductor Manufacturing Company, Singapore, Singapore

[21] Appl. No.: 09/435,435

[22] Filed: Nov. 22, 1999

[51] Int. Cl.$^7$ ....................................................... B65B 1/04
[52] U.S. Cl. ................................ 222/64; 222/55; 137/395
[58] Field of Search .......................... 222/64, 40, 55–58; 137/386, 395, 396

[56] References Cited

U.S. PATENT DOCUMENTS

| | | | |
|---|---|---|---|
| 3,627,555 | 12/1971 | Driscoll . | |
| 4,136,708 | 1/1979 | Cosentino et al. | 137/99 |
| 5,375,739 | 12/1994 | Granfelt | 222/56 |

OTHER PUBLICATIONS

Wolf et al., "Silicon Processing for the VLSI Era," vol. 1, Process Technology, Lattice Press, Sunset Beach, CA (1986), pp. 520–523 and pp. 529–534.

*Primary Examiner*—Steven O. Douglas
*Attorney, Agent, or Firm*—George O. Saile; Rosemary L.S. Pike

[57] ABSTRACT

An apparatus for adjusting a measure of liquid for mixing with a second liquid which includes an adjustable overflow tube cooperating within a closed tank. The tank has a threaded top port and a sleeved bushing bottom port. The top and bottom ports are axially in alignment. The overflow tube has a sidewall defining a bore. The sidewall has a smooth outside surface on one end and a length of external thread cut on the other end. This length of external thread is preceded by a "T" handle for turning the overflow tube and proceeded by an overflow aperture through the side wall. The smooth end of the adjustable overflow tube is inserted through the threaded top port into the sleeve bushing of the bottom port for a leak-proof fit thereafter, engaging with the threaded top port. The overflow tube is rotated to translate the overflow tube until the overflow aperture reaches a desired level. At this level all liquid enters the overflow aperture and flows in through the bore to a recovery container located below the tank.

17 Claims, 3 Drawing Sheets

ADJUSTABLE TANK OVERFLOW FOR FLUID CHEMICALS

BACKGROUND OF THE INVENTION

1. Technical Field

This invention relates generally to an apparatus and method for microelectronics fabrication. More specifically, the invention relates to methods for controlling the mix ratio of an etching chemical used for etching microcircuit linewidths that are patterned on semiconductor wafers.

2. Description of the Prior Art

The following document relates to methods dealing with wet etching for VLSI.

"Silicon Processing for the VLSI Era" Vol. 1, Process Technology by Stanley Wolf et al, Published by Lattice Press, Sunset Beach, Calif. in 1986, pp. 520–523 and 529–534 describing wet etch processing using various etching chemicals including HF.

The manufacture of an integrated circuit device requires the formation of various layers (both conductive and non-conductive) above a substrate to form the necessary components and interconnects. During the manufacturing process, certain layers or portions of layers must be removed in order to pattern and form the various components and interconnects. Etching in microelectronics fabrication is a process by which material is removed from the semiconductor wafer or thin films on the wafer surface. During the photolithographic process, a mask layer is used to protect specific regions of the wafer surface, the goal of etching is to precisely remove the material which is not covered by the mask.

Several etching processes are used for microelectronics fabrication. In-Situ sputter etch for oxide removal, and wet etch for patterning of linewidths. This invention is concerned with improvements to the wet etching process.

Wet etching processes are generally isotropic. As such, they are inadequate for defining features less than about 3 $\mu$m wide. Nevertheless, for those process that involve patterning of linewidths greater than 3 $\mu$m, wet etching continues to be a viable technology. Since it turns out that a significant fraction of semiconductor products are still being fabricated with such geometries, wet etching should not be ignored.

The reason wet etching has found widespread acceptance in microelectronic fabrication is that it is a low cost, reliable, high throughput process with excellent selectivity for most wet etch processes, with respect to both mask and substrate materials. Wet etching of $SiO_2$ films in microelectronic applications is usually accomplished with various hydrofluoric acid (HF) solutions. This is because silicon dioxide is readily attacked by room temperature HF, while silicon is not. Etching takes place according to the overall reaction: $SiO_2 + 6HF > H_2 + Si F_6 + 2 H_2O$.

SUMMARY OF THE INVENTION

The present invention contemplates a wet etching process station which uses a flow control valve for measuring the volume of hydrofluoric (HF) acid to be added to and mixed with a volume of deionized (DI) water diluent contained in a second tank. The mixture compositions can be varied to yield different etch rates.

The concentration of HF supplied by chemical manufacturers is 49% in water. Such concentrated HF, however, etches $SiO_2$ too quickly for good process control, e.g. thermally grown $SiO_2$ is etched at approximately 300 angstroms/second at 25° C. Thus diluted HF is generally used instead. The importance of etch rate becomes a function of how repeatable the dilution of HF is done. Prior art methods using flow control valves are not sufficiently accurate for process control due to pressure and temperature sensitivity thereby causing fluctuation in etch-rate.

This invention is concerned with improvements for the control of etching rate of semiconductor materials.

The principal object of the invention is to accurately and repeatedly measure a volume of concentrated HF supplied by chemical manufacturers.

Another object of the invention is to provide a means of adjusting and fixing the measure of a volume of concentrated HF for the purpose of fine-tuning the etch rate.

Another object of the invention is to provide means for eliminating measurement variances associated with flow control valves caused by sensitivity to pressure and temperature changes.

Yet another object of this invention is to provide an effective and cost saving means for obtaining volume accuracy and repeatability.

Still another object of this invention is to provide an analog means of adjusting a volume of chemical without complicated mechanisms.

DETAILED DESCRIPTION OF THE PREFERRED EMBODIMENT

The invention is designed to measure the volume of hydrofluoric (HF) acid to be added to and mixed with a volume of deionized (DI) water diluent contained in a second tank. The mixture compositions can be varied to yield different etch rates. The concentration of HF supplied by chemical manufacturers is 49% in water. Such concentrated HF, however, etches $SiO_2$ too quickly for good process control. Thus diluted HF is generally used instead. The importance of etch rate becomes a function of how repeatable the dilution of HF is done. Prior art methods using flow control valves are not sufficiently accurate for process control due to pressure and temperature sensitivity thereby causing fluctuation in etch-rate.

The apparatus of the invention enables the measure of a volume of to be adjusted and then fixed to measure a repeatable volume of liquid for mixing with a second liquid The apparatus includes an adjustable overflow tube cooperating within a closed tank. The overflow tube is adjusted until an overflow aperture reaches a desired level. At this level, all excess liquid flows into the overflow ate and drains through the bore of the tube onto a recovery container located below the tank.

Figure 1:
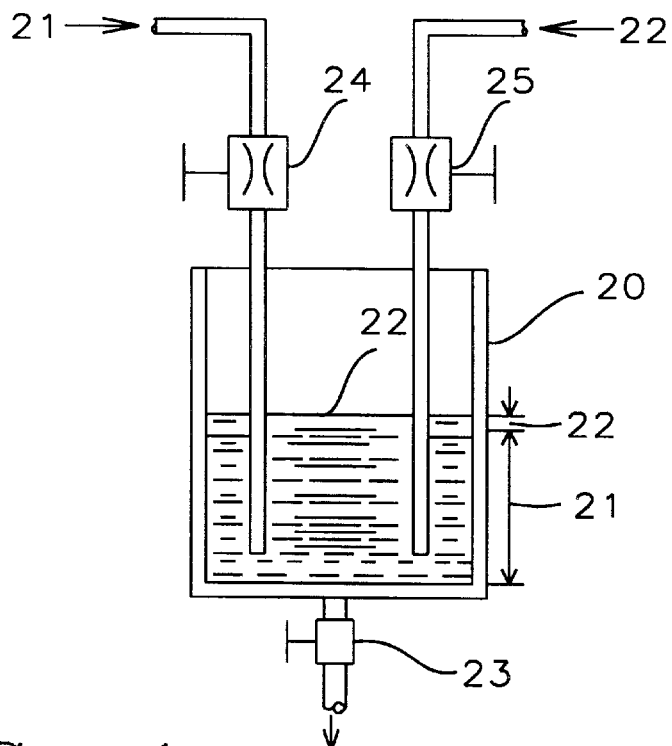
FIG. 1 is a plumbing schematic of an apparatus according to the prior art
Figure 2:
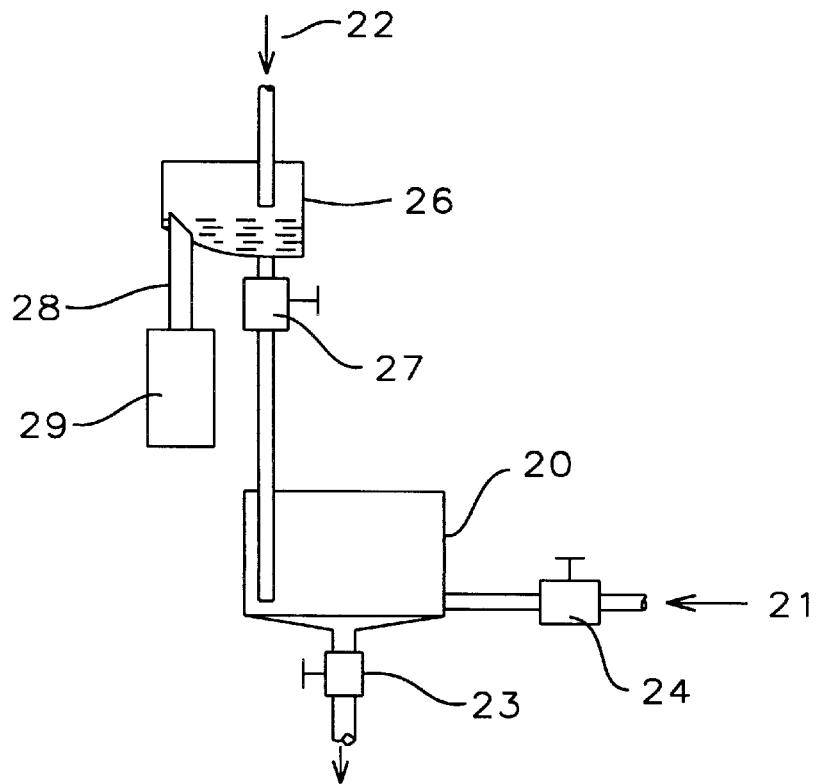
FIG. 2 is a side view of an overflow tank of the prior art.

Referring now to FIGS. 1 and 2 illustrating schematics of conventional methods used for measuring a volume of a liquid chemical in preparation for dilution with a second chemical. In FIG. 1, a process tank 20 is shown containing a ratio of 1 unit of HF acid 22 to 10 units of DI water 21. The volume of water 21 is measured by opening and closing a metering valve 24, in a like manner, the volume of HF acid 22 is also measured by opening and closing a metering valve 25. Using the same control and timing, everything else being equal, it becomes intuitive as illustrated by the graphic ratio, that a variance in volume accuracy would have a greater impact to the 1 unit of HF acid than to the 10 units of DI water. Valve 23 is opened for draining the spent acid diluent to a recovery container, not shown. FIG. 2 illustrates a classic tank overflow method used in many wet process stations where a measured volume of HF acid is to be mixed with a measured volume of DI water. The process tank 20 is equivalent to that in FIG. 1. The difference is in the method in measuring the HF acid which includes a closed tank 26 with a top inlet port 22 for filling the tank with the HF acid by opening a supply valve, not shown. An outlet port valve 27 is opened after a volume of chemical is measured using a fixed overflow tube 28. The fixed overflow tube, in this example, does not allow for fine tuning of the measured volume.

Figure 4:
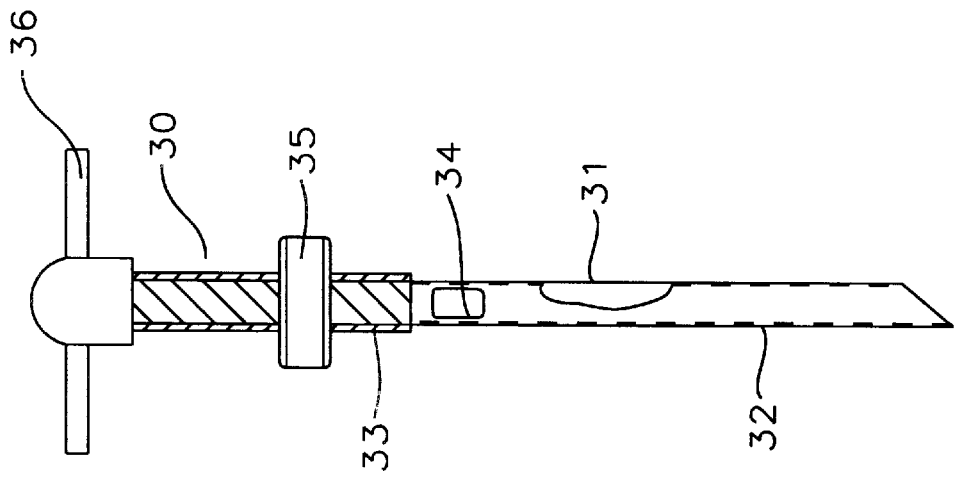
FIG. 4 is a view of the overflow tube of the invention.
Figure 3:
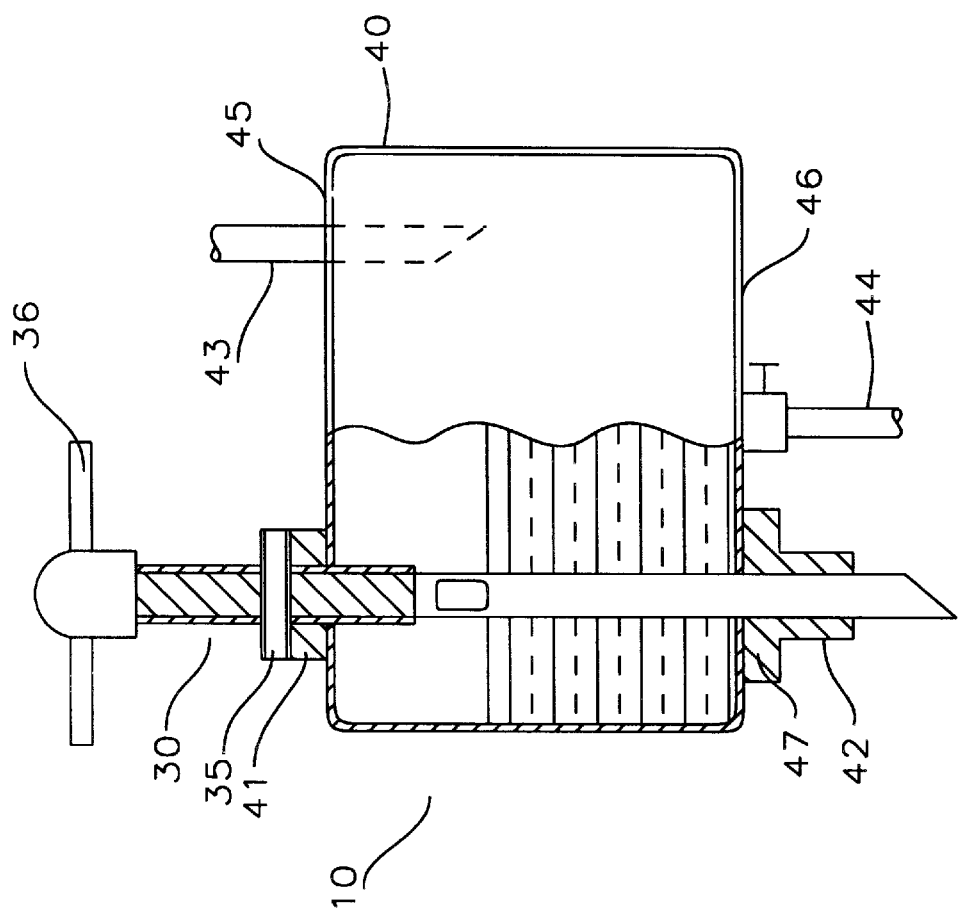
FIG. 3 is an illustration of a overflow tank of the invention.
Figure 5:
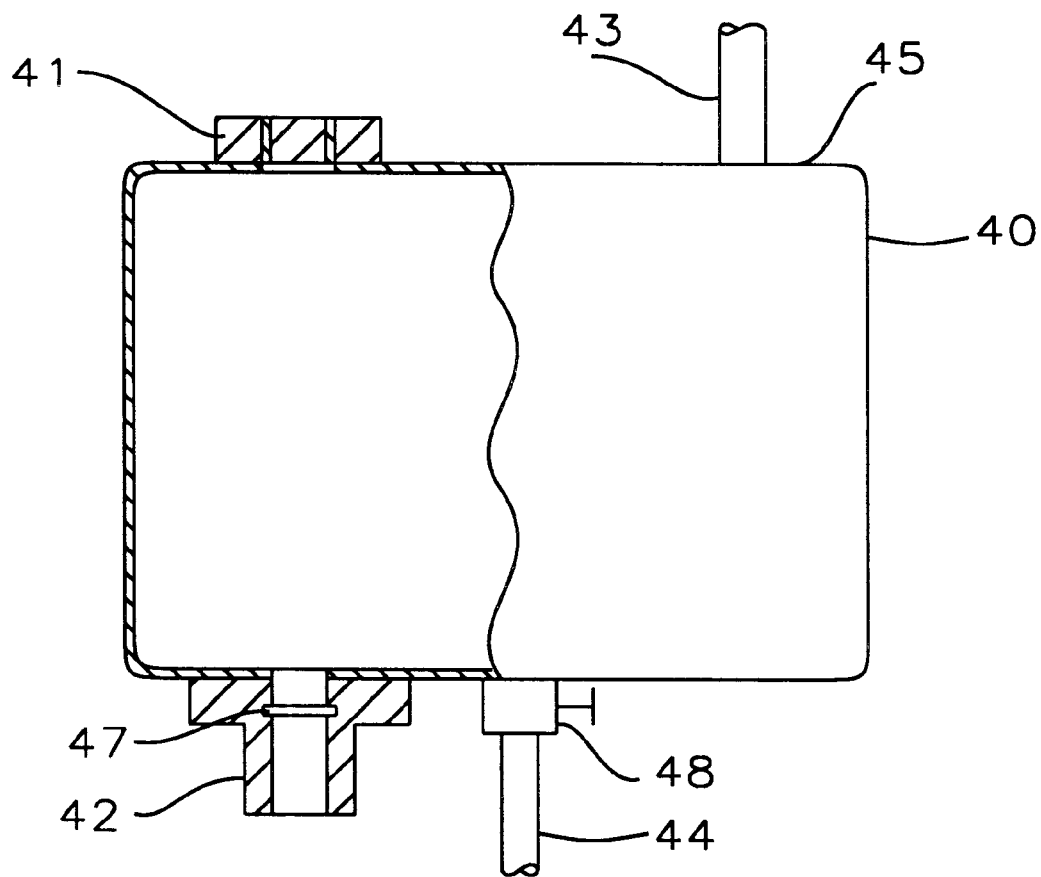
FIG. 5 is an illustration of a closed tank of the invention.

Referring now to FIGS. 3, 4 and 5, of the invention, showing an apparatus for adjusting a measure of liquid for mixing with a second liquid. FIG. 3 illustrates the assembled apparatus 10 which includes an adjustable overflow tube 30 cooperating within a closed tank 40, also shown separately in FIGS. 4 and 5, respectfully.

FIG. 5 illustrating tank 40 showing two ports on the top surface 45, and two on the bottom surface 46. The top ports include an inlet port 41 that is fabricated to form a threaded nut block and is securely mounted to concentrically cover a port opening on the top surface of the tank. The other top port is a supply inlet port 43. The two bottom ports include a sleeved bushing port 42 and an outlet port 44. The sleeved bushing port 42 includes a smooth inside diameter with a groove 49 for containing a seal 47. Ports 41 and 43 are in coaxial alignment. The top supply inlet port 43 has a two way shut off valve, not shown, to open when filling the tank with a chemical and to close when an overflow is detected. Outlet port 44 includes a two way valve 48 to open for transferring the measured volume of liquid to a tank containing the diluent.

Referring now to FIGS. 3 and 4 showing the overflow tube 30. The overflow tube has a sidewall 31 defining a bore. The sidewall has a smooth outside surface on its distal end 32 and a length of external thread formed on the proximal end 33. This length of external thread 33 is preceded by a "T" handle 36 for turning the overflow tube and proceeded by an overflow aperture 34 through the side wall 31. The "T" handle 36 is attached to the overflow tube by being laterally assembled to a threaded cap member engaging the thread at the proximal end of the overflow tube. The "T" handle 36 functions as a handle as well as a cap for capping the tube, thereby, preventing particulate contaminants from entering the tube.

When joining the overflow tube 30 with the closed tank 40, the distal end 32 of the overflow tube is inserted through the threaded top port 41 into the sleeve bushing of the bottom port 42 for a leak-proof fit, thereafter, engaging with the threaded top port 41. The sleeve bushing contains a seal of a compatible material for a leak free assembly. The overflow tube 40 is rotated to advance or to retard the overflow aperture 34 until a desired volumetric level is reached. A threaded lock nut 35 is tightened to secure the desired position of the overflow aperture 34. At this level, all HF acid entering the overflow aperture 34 flows in through the bore to a recovery container located below the tank. The fine tuning is done after several process iterations. After qualifying the etching process, the volume setting will remain in place and will repeat the measured volume without further adjustment.

While the invention has been particularly shown and described with reference to the preferred embodiments thereof, it will be understood by those skilled in the art that various changes in form and details may be made without departing from the spirit and scope of the invention

What is claimed is:

1. An apparatus for adjusting a measure of liquid for mixing with a second liquid comprising:

an adjustable overflow tube cooperating within a closed tank, said closed tank having a threaded top port and a sleeved bushing bottom port, said top and bottom ports are axially in alignment, said overflow tube having a sidewall defining a bore, said sidewall having a smooth outside surface on one end and a length of external thread formed on the other end, said length of external thread is preceded by a "T" handle for turning said overflow tube and proceeded by an overflow aperture through said side wall, said smooth end of said adjustable overflow tube is inserted through the threaded top port into the sleeve bushing of said bottom port for a leak-proof fit, thereafter, engaging with said threaded top port, said overflow tube is rotated thereby advancing said overflow tube until the overflow aperture reaches a desired level thereafter passing all overfilled liquid in through the bore and into a recovery container.

2. The apparatus of claim 1 wherein said closed tank includes a top inlet port for filling said closed tank with a liquid.

3. The apparatus of claim 2 wherein said top inlet port includes a two-way valve to be opened for filling said closed tank with a liquid and for closing when a desired tank level is obtained.

4. The apparatus of claim 1 wherein said closed tank includes an outlet port for draining said measured liquid.

5. The apparatus of claim 4 wherein said outlet port includes at least a two-way valve to be closed during filling the closed tank and opened for transferring a measured volume of liquid to another tank containing a second liquid.

6. The apparatus of claim 1 wherein said overflow aperture is adjusted by turning said overflow tube, said overflow aperture is raised or lowered by the engagement of said length of external thread of overflow tube with said threaded top port.

7. The apparatus of claim 1 wherein said "T" handle functions as a handle for turning said overflow tube as well as a end cap for closing off the threaded end of said overflow tube thus preventing particulate contaminates from entering the liquid through the said bore.

8. The apparatus of claim 1 wherein the leak-proof fit between the smooth outside surface of the overflow tube and the sleeve bushing of said bottom port is accomplished by sealing with elastomeric "O" ring seals.

9. The apparatus of claim 8 wherein the elastomeric "O" ring seals are selected from the group including TEFLON, viton, polyurethane.

10. A method for adjusting a measure of liquid for mixing with a second liquid comprising the steps of:

providing a closed tank, having a threaded top port and a sleeved bushing bottom port, said top and bottom ports are axially in alignment;

providing an overflow tube having a sidewall defining a bore, said sidewall having a smooth outside surface on one end and a length of external thread formed on the other end, said length of external thread is preceded by a "T" handle for turning said overflow tube and proceeded by an overflow aperture through said side wall, said smooth end of said adjustable overflow tube is inserted through the threaded top port into the sleeve bushing of said bottom port for a leak-proof fit, thereafter, engaging with said threaded top port, said overflow tube is rotated thereby advancing said overflow tube until the overflow aperture reaches a desired level thereafter passing all overfilled liquid in through the bore and into a recovery container.

11. The method of claim 10 wherein said closed tank includes a top inlet port for filling said closed tank with a liquid.

12. The method of claim 10 wherein said top inlet port includes a two-way valve to be opened for filling said closed tank with a liquid and for closing when a desired tank level is obtained.

13. The method of claim 10 wherein said closed tank includes an outlet port for draining said measured liquid.

14. The method of claim 13 wherein said outlet port includes at least a two-way valve to be closed during filling the closed tank and opened for transferring a measured volume of liquid to another tank containing a second liquid.

15. The method of claim 10 wherein said overflow aperture is adjusted by turning said overflow tube, said overflow aperture is raised or lowered by the engagement of said length of external thread of overflow tube with said threaded top port.

16. The method of claim 10 wherein said "T" handle functions as a handle for turning said overflow tube as well as a end cap for closing off the threaded end of said overflow tube thus preventing particulate contaminates from entering the liquid through the said bore.

17. The method of claim 10 wherein the leak-proof fit between the smooth outside surface of the overflow tube and the sleeve bushing of said bottom port is accomplished by sealing with elastomeric "O" ring seals.

* * * * *